Jan. 5, 1965

M. LEICHSENRING 3,164,803

CONTROL MEANS FOR THE SELECTIVE ENERGIZATION OF AN
ELECTRICALLY ENERGIZABLE DEVICE FROM AN
ELECTRICAL POTENTIAL SOURCE

Filed June 19, 1964

INVENTOR.
Max Leichsenring

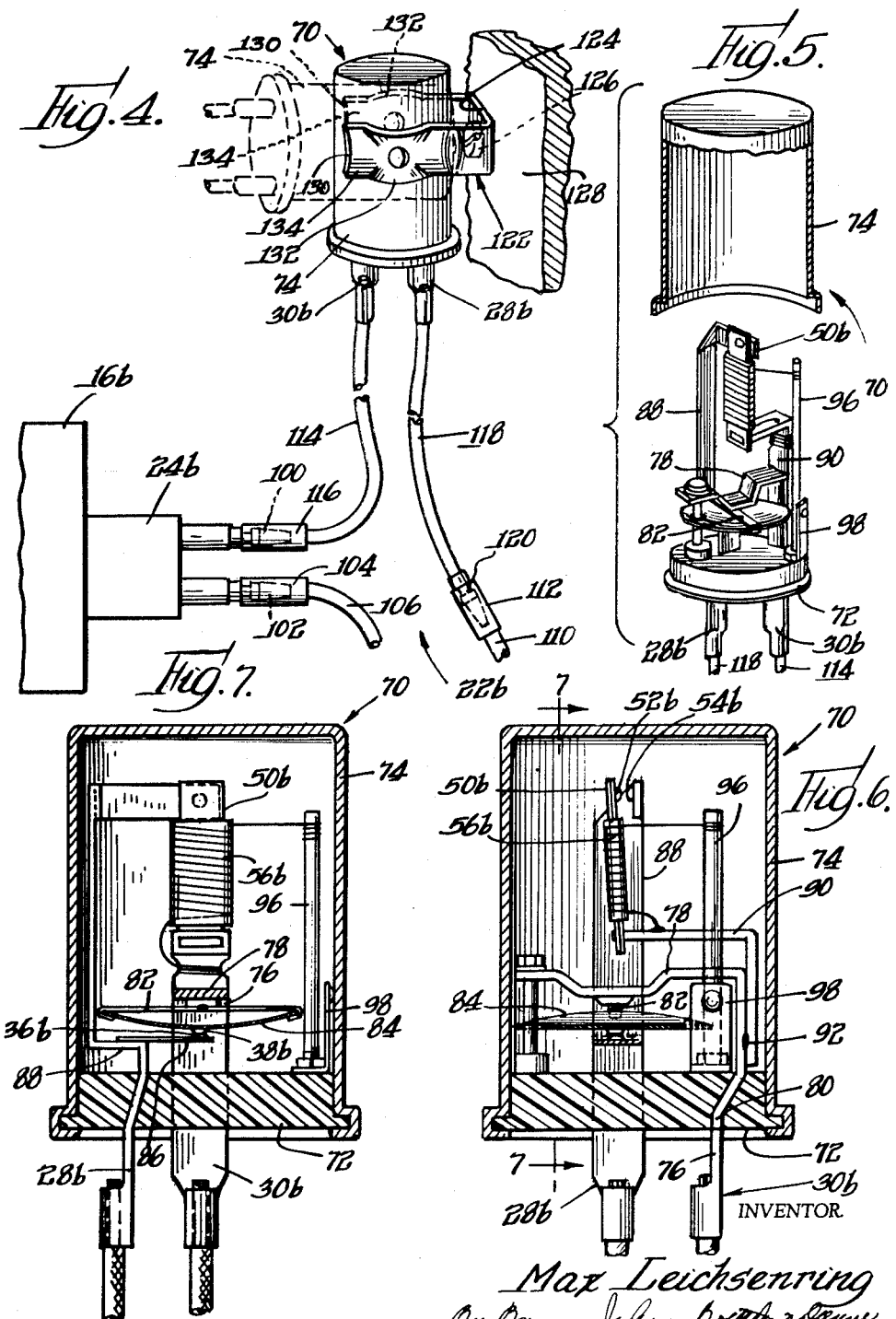

Jan. 5, 1965 M. LEICHSENRING 3,164,803
CONTROL MEANS FOR THE SELECTIVE ENERGIZATION OF AN
ELECTRICALLY ENERGIZABLE DEVICE FROM AN
ELECTRICAL POTENTIAL SOURCE
Filed June 19, 1964 3 Sheets-Sheet 3
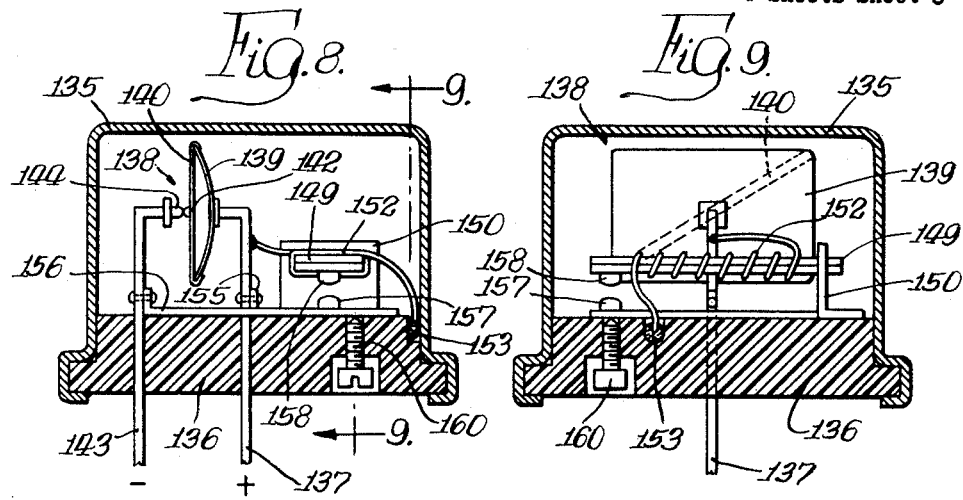
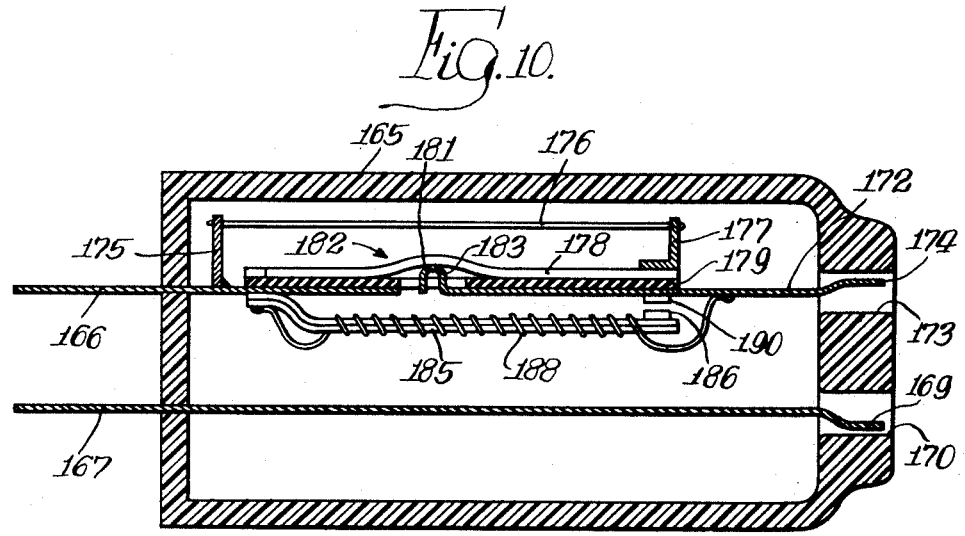
INVENTOR.
Max Leichsenring,
BY Brown, Jackson
Boettcher & Dienner
Attys.

United States Patent Office 3,164,803
Patented Jan. 5, 1965

3,164,803
CONTROL MEANS FOR THE SELECTIVE ENERGIZATION OF AN ELECTRICALLY ENERGIZABLE DEVICE FROM AN ELECTRICAL POTENTIAL SOURCE
Max Leichsenring, 4525 N. Francisco St., Chicago 25, Ill.
Filed June 19, 1964, Ser. No. 376,527
14 Claims. (Cl. 340—72)

The present application is a continuation-in-part of my application Serial No. 216,163, filed August 10, 1962, now abandoned, and which application, in turn, is a continuation-in-part of my application Serial No. 29,375, filed May 16, 1960 (now abandoned).

The present invention relates to control means for use between an electrical potential source and an electrically energizable device to control predetermined selective energization of the latter.

The present invention has utility for a wide variety of uses as, for example, with the brake signal systems of automotive vehicles and for illuminated display devices and ornamental purposes.

The control means of the present invention when employed with the brake system of an automotive vehicle in which a steady signal is normally affected by actuation of the vehicle brakes, may provide for an initial limited period of intermittent energization of the brake signal followed thereafter by a steady energization of the signal, and if desired re-establish the flashing signal after the steady signal has been in effect a predetermined length of time, and with such alternate flashing and steady signals being given until the brakes of the vehicle are released. Signaling of the character noted is of advantage in alerting a trailing motorist that a lead vehicle is being braked.

The control means of the present invention also has typical utility, for example, in a display or advertising sign which may be alternately energized for predetermined lengths of time with intermittent current flow and with steady current flow so as to attract the attention of a viewer.

Accordingly, it is the purpose of the present invention to provide a novel control means of the character noted for utilization between a source of electric potential and an electrically energizable device.

It is an object of my invention to provide an electric control means comprising circuit means defined by first and second circuits in parallel relation with each other and in series relation to a potential source and an electrically energizable device, a cycling means in the first circuit for initially effecting intermittent energization of the electrically energizable device, and time delay means in the second circuit for shunting the first circuit after a predetermined interval of energization of the electrically energizable device for subsequently effecting continuous energization of the electrically energizable device through the second circuit.

A further object is to provide control means as last noted in which the intermittent and steady energization of the electrically energizable device is continuously repeated as long as the circuit means of the control means is in circuit with the potential source and electrically energizable device.

A further object is to provide electric control means of the character noted in which the periods of intermittent and/or steady energization of an electrically energizable device may be adjusted.

Other objects and features of my invention will appear from the following detail description of certain preferred embodiments of my invention.

FIGURE 1 is a diagrammatic illustration of an automotive vehicle equipped with hydraulic brakes and incorporating an exemplary embodiment of the invention, certain components being illustrated on an enlarged scale.

FIGURE 2 is a diagrammatic illustration of an automotive vehicle incorporating a modified embodiment of the invention, certain components being illustrated on an enlarged scale;

FIGURE 3 is a diagrammatic illustration of an automotive vehicle incorporating another modified embodiment of the invention, certain components being illustrated on an enlarged scale;

FIGURE 4 is a perspective view of signal control structure incorporated in the vehicle of FIGURE 3;

FIGURE 5 is a partially exploded and partially sectioned perspective view on an enlarged scale of a signal control unit of FIGURE 4;

FIGURE 6 is a longitudinal side view of the control unit of FIGURE 5 on an enlarged scale showing the cover assembled on the base of the unit and sectioned to reveal internal structure;

FIGURE 7 is a longitudinal sectional view of the unit of FIGURE 5 taken generally with reference to the line 7—7 of FIGURE 6;

FIGURE 8 is a vertical cross-sectional view of a control unit according to another embodiment of the invention with certain parts being shown in elevation;

FIGURE 9 is a vertical cross-sectional view of the control unit of FIGURE 8 with the view being taken substantially along the line 9—9 of FIGURE 8 looking in the direction indicated by the arrows; and FIGURE 10 is a vertical sectional view of the control unit according to still another embodiment of the invention with certain parts being shown in elevation.

Referring to the drawings in greater detail, a highway vehicle incorporating the invention is illustrated diagrammatically in FIGURE 1 and identified by the reference number 10. This typical vehicle is equipped with brakes 12 which as illustrated are operated by fluid supplied under pressure through a line 14 from a master cylinder 16 operated by a brake pedal 18.

A brake warning or signal light 20 mounted on the rear of the vehicle 10 in the usual manner is energized through a circuit 22, which as shown includes a fluid pressure control switch 24 connected to the brake line 14. The switch 24 is closed by operation of the pedal 18 to create braking pressure in the line 14.

In the brake signal systems in most common use on conventional automotive vehicles the closure of a control switch corresponding to the switch 24 as described operates to effect a continuous, steady energization of brake lights corresponding to the light 20 described.

As previously intimated, a steady signal from the brake light may not be sufficient to alert a trailing motorist to the application of the brakes. As a consequence, the trailing motorist may not become aware that the vehicle ahead is slowing until it is too late to avoid a hazardous condition.

The present invention stems from a recognition that it is particularly important in avoiding these hazardous situations to alert the trailing motorist to the initial application of brakes by the leading vehicle. Recognizing the importance of alerting the motorists to this initial application of the brakes, the invention provides in the typical automotive vehicle 10 new and improved signal light control means which responds to the normal application of the brakes to produce a flashing signal during an initial limited period of time which is sufficient to alert the trailing motorist, the flashing signal being followed by a steady brake signal which continues until the brakes are released.

In the first embodiment of the invention, illustrated in FIGURE 1, the switching structure provided in accordance with the invention and incorporated into the signal circuit 22 comprises an elongated case 26 having two electrical switch terminals 28, 30 adapted to be connected into the circuit 22 in series with the light 20.

The case 26 houses a flashing or cycling switch 32, which is connected in series between the two terminals 28, 30. Thus, it will be appreciated that the cycling switch 32 is connected in series with both the signal light 20 and the brake operated switch 24.

The cycling switch 32 is designed to respond to the application of a voltage across the terminals 28, 30 to effect a cyclic switching of the terminals 28, 30 into a switch connection to each other. Within the broader aspects of the invention, the specific construction of the cycling switch 32 can be varied from the particular preferred form illustrated in FIGURE 1.

The switch 32 illustrated comprises an elongated channel 34 centrally disposed within the elongated case 26. A stationary contact 36 secured to the underside of the channel 34 and insulated from the channel is connected to the terminal 30. The contact 36 is opposed by a movable contact 38 carried by a flexible spring member 40 supported on the channel 34 in overlying relation to the contact 36.

The contact 36 is connected through a resistance wire 42 to the other terminal 28. One end of the wire 42 is connected to a bracket 44 on the spring element 40 in a manner such that the wire 42, upon cooling, contracts and acts through the bracket 44 to flex the spring element 40 to engage the contact 38 with the contact 36 and complete a circuit between the terminals 28 and 30. This is the normal condition of the flashing switch 32 and effects an immediate energization of the light 20 upon closure of the switch 24.

However, the subsequent passage of current through the wire 42 heats the wire, causing it to expand and allow the spring element 40 to move the contact 38 away from the contact 36 to interrupt the circuit to the light 20. Subsequent cooling of the wire, which follows opening of the switch 32, causes the contacts 36 and 38 to close, to reestablish the circuit to continue the cycle.

The cyclic energization of the light 20 thus produced is terminated after a brief alerting period which may continue two to five seconds. However, as will appear from the ensuing description of the means used to automatically terminate cyclic energization of the light 20, the time duration of the alerting period can be varied in accordance with the desires of the designer of the structure. An alerting period of two to five seconds during which the signal light is flashed has proven to be satisfactory.

The case 26 also houses a time delay switch which responds to closure of the switch 24 to effect a desired delayed termination of the cyclic energization of the light 20. This time delay switch comprises a bimetallic cantilever 50 secured to one end of the channel 34 in underlying relation to the channel, as shown. The free end of the cantilever 50 carries a movable contact 52 in opposing relation to a stationary contact 54. The contact 54 is connected to the terminal 30 and the contact 52 is connected through the cantilever 50 to the terminal 28 in a manner such that upon closure of the contacts 52 and 54 current between the terminals 28, 30 is carried through the cantilever 50. This cantilever may be designed to have a significant resistance to the flow of current therethrough so that the flow of current through the cantilever effects a substantial heating of the cantilever. The purpose of this will appear presently.

A high resistance heating coil 56 is coiled around the bimetallic cantilever 50 and continuously connected between the terminals 28, 30. The resistance of the coil 56 is sufficiently high to limit the current flow through the coil 56 to a value insufficient to energize the signal light 20.

When unheated, the cantilever 50 carries the contact 52 in spaced relation to the contact 54. Upon closure of the switch 24, the coil 56 progressively heats the cantilever 50 causing it to swing the contact 52 toward the contact 54. The time required for the bimetallic cantilever 50 to engage the contact 52 with the contact 54 determines the period during which the light 20 flashes to alert a trailing motorist. The duration of this period is affected by the thermal characteristics of the cantilever, the heating rate of the coil 56, and other factors which can be varied by design to produce the desired length of the alerting period.

Upon closure of the time delay switch contacts 52, 54, the light 20 is continuously energized independently of the flasher switch 32. The flow of current through the bimetallic element 50 heats this elements to a still higher temperature to assure firm engagement of the contact 52 with the contact 54 for any desired predetermined length of time.

The period of continuous energization of the light 20 continues until the brakes are released and the switch 24 opens, or until cooling of the heating coil 56 of the delay switch again opens the delay switch steady light circuit so that the flashing switch 32 again effects cyclic energization of light 20 with such alternate energization being effected until the brake 24 is released.

It will be understood that the bimetallic cantilever 50 by selection of known bimetallic elements may maintain contacts 52 and 54 in circuit closed position to provide steady energization of light 20 until the brakes are released even though the current flow through coil 56 substantially diminishes and cools off.

From the foregoing it will be seen that the control unit includes circuit means between terminals 28 and 30 in series with the battery of the vehicle and light 20 comprising a first circuit embodying cyclic switch means 32, and a second circuit in parallel with such first circuit embodying time delay switch means formed by the cantilever 50 and coil 56 and associated components.

The vehicle 10a illustrated diagrammatically in FIGURE 2 incorporates a modified form of the invention very similar to the form incorporated into the vehicle 10 just described in relation to FIGURE 1. Component elements of the form illustrated in FIGURE 2 which constitute counterparts of previously described components of the form illustrated in FIGURE 1 are identified with the same reference numbers with the addition of the suffix "a."

Whereas, the heating coil 56 for the time delay switch cantilever 50 is grounded through the warning light 20 in the vehicle 10 of FIGURE 1, the heating coil 56a for the corresponding time delay switch actuating cantilever 50a of the vehicle 10a of FIGURE 2 is grounded directly, independently of the warning light 20a. In FIGURE 2, the direct grounding of the heating coil 56a is illustrated by the conductor 60. The direct grounding of the heating coil 56a in the vehicle 10a provides for continuous energization of the heating coil 56a after the brake switch 24a is closed in response to pressure applied to the brake pedal 18a. The heating of the coil 56a which begins immediately upon closure of the switch 24a continues steadily until the switch 24a is subsequently opened upon release of the brakes.

The steady heat from the coil 56a warms the bimetallic cantilever 50a to cause the cantilever to engage the contact 52a with the contact 54a to provide the delayed steady energization of the warning light 20a. The continuing, steady heat from the coil 56a keeps the temperature of the cantilever 50a at an assured high level to firmly hold the contacts 52a, 54a in mutual engagement.

At this point, it may be observed that the energization of the heating coil 56 in the vehicle 10 previously described in relation to FIGURE 1 is uneven during the period when the signal light 20 is being flashed by the cycling switch 32. This is due to the fact that the voltage across the coil 56 in FIGURE 1 is varied during cycling of the switch 32. However, even when the switch 32 of the vehicle 10 is closed, the energizing voltage applied to the heating coil 56 is substantial because of the resistance of the wire 42 connected in parallel with the coil 56.

Even though the heating coil 56a in the vehicle 10a of FIGURE 2 is steadily energized, whereas the heating coil 56 in the vehicle 10 of FIGURE 1 is energized by varying voltage while the warning light 20 is flashing, the time required for the time delay switch to close in the vehicle 10a of FIGURE 2 can be varied through design of the components to conform to a desired value similar to that required for closing of the time delay switch used in the vehicle 10 of FIGURE 1. It will be appreciated that the time required for the time delay switch to close in either vehicle is determined by the wattage of the heating coils and other factors which will be well understood by those skilled in the art.

It is noteworthy that, upon mutual engagement of the contacts 52a, 54a to effect a steady energization of the warning lights 20a in the vehicle 10a, the current to the warning lights 20a is carried largely through the time delay switch which has much lower electrical resistance to warning light current than does the resistance wire 42a. As a consequence, the resistance wire 42a cools, allowing the cycling switch 32a to close and remain closed. In its closed condition, the cycling switch 32a can carry a portion of the warning light current, which, because of the low resistance of the time delay switch, is so limited that the resistance wire 42a is not heated sufficiently to cause the cycling switch 32a to open. As a result, both the cycling switch 32a and the time delay switch formed by the contacts 52a, 54a remain closed to form parallel circuits extending through the warning lights 20a to assure a steady full voltage power supply to the warning light 20a.

In the event the brakes are momentarily released and reapplied a continuous energization of the light 20a is immediately reestablished, since the cantilever 50a does not have an opportunity to cool and separate the contacts 52a, 54a. Thus the cyclically flashing signal is not restarted by a mere momentary release of the brakes.

If desired, an auxiliary warning light or lights 61, FIGURE 2, can be connected to the output side of the switch 24a ahead of the cycling switch 32a to provide a steady warning signal even when the lights 20a are flashing.

The vehicle 10b illustrated in FIGURE 3 incorporates another modified form of the invention. Component elements of the vehicle 10b of FIGURE 3 which are similar to those of the vehicles previously described in relation to FIGURES 1 and 2 are identified with the same reference numbers, but with the use of the suffix "b."

The vehicle 10b of FIGURE 3 differs from a conventional vehicle having brake controlled warning lights only by the addition to the vehicle 10b of a control unit 70 having a novel and highly advantageous construction well adapted for most economical manufacture on a mass production basis, and being inherently well suited for extremely convenient and substantially fool-proof installation in the vehicle.

As illustrated in FIGURES 4 to 7, the control unit 70 incorporated in the vehicle 10b of FIGURE 3 comprises a circular base 72 of a suitable insulating material (preferably plastic) fitted into one end of a cylindrical shell or deep cover 74. The cylindrical shell 74 is preferably of a drawn aluminum construction, as illustrated.

The input terminal 30b of the unit 70 is formed of a generally L-shaped conductor strip 76 of a substantial thickness having one leg 78 disposed within the shell 74 in parallel relation to the circular disk-shaped base 72, as shown in FIGURE 6. Another leg 80 of the conductor strip 76 extends out through the base 72 to form the input terminal 30b.

A downwardly offset medial portion of the inner leg 78 of the conductor 76, FIGURE 6, is attached to a resistance ribbon 82 connected in tension between opposite sides of a bowed disk 84 that supports a contact 38b in opposing relation to a contact 36b carried by a cantilever 86, FIGURE 7. The cantilever 86 is supported by a conductor strip 88 which extends out through the base 72 to form the output terminal 28b.

Before the brakes 12b of the vehicle 10b are applied, the resistance ribbon 82 normally cools and contracts to increase the degree of bow in the disk 84 which moves the contact 38b downwardly with reference to FIGURE 7 into engagement with the contact 36b to establish a circuit between the input terminal 30b and the output terminal 28b, which circuit extends through the resistance ribbon 82.

The conductor strip 88 is shaped to extend around the disk 84 and upwardly, with reference to FIGURE 7, from the base 72 to support a time delay switch contact 54b in opposing relation to a movable time delay switch contact 52b carried by a bimetallic cantilever 50b that is supported by a bracket 90 attached as shown, FIGURE 6, by a weld 92 to the input conductor strip 76. A heating coil 56b positioned around the bimetallic cantilever 50b is connected at one end to the bracket 90 energized by the input conductor 76 and is connected at its other end to a grounding terminal post 96 anchored to the base 72 and projecting past the disk 84 out into the shell 74, as illustrated in FIGURE 7.

The grounding post 96 is grounded to the metal shell 74 as an incident to placement of the shell 74 on the base 72 in the assembly of the unit 70. This is accomplished by means of a flexible cantilever conductor 98 secured to the base 72 by the post 96, as shown, and shaped to urge the free end of the conductor 98 out into engagement with the adjacent wall of the shell 74. When cool, the cantilever 50b supports the contact 52b in spaced relation to the contact 54b.

The control unit 70 has a construction which provides for most convenient mounting of the control unit on the vehicle 10b and incorporation of the control unit into the warning light circuit 20b in a manner which greatly minimizes the chance of error in connecting the unit to coacting structure.

As illustrated in FIGURE 4, the conventional pressure operated control switch 24b for the brake lights 20b has two male terminals 100, 102. With reference to the drawings, one of the switch terminals, in this instance the terminal 102, connects with a female connector 104 on a lead wire 106 from the vehicle battery 108. Another lead wire 110 extending to the warning light 20b carries a female connector 112 which in a conventional vehicle would be placed on the output terminal 100 of the pressure control switch 24b.

It is necessary that the switch 24b be connected to supply power when closed directly to the input terminal 30b of the unit 70. An insulated electrical lead 114 connected at one end with the input terminal 30b of the unit 70 is connected at its other end with a female coupling or connector 116 similar to the female connector 112 on the lead 110. Another insulated lead 118 connected at one end to the output terminal 28b of the unit 70 is connected at its other end to a male coupling or connector 120 adapted to connect into the female connector 112 on the lead 110.

To connect the unit 70 into the warning light control circuit 22b, the female connector 112 of the lead 110 extending through the warning light 20b is pulled off the output male terminal 100 of the switch 24b. The unit 70 is connected electrically in series between the switch 24b and the lead 110, the female and male couplings 116, 120 on the leads 114, 118 permitting the coupling of the unit 70 to the switch 24b and lead 110 to be made in only one way, the correct way, as illustrated in FIGURE 4.

The leads 114, 118 on the unit 70 have substantial length permitting the unit to be supported some distance away from the switch 24b where mounting of the unit 70 may be most convenient. Most convenient mounting of the unit 70 is provided by a U-shaped resilient mounting bracket 122 formed of metal and being shaped to embrace and support the cylindrical shell 74 of the unit 70 in any one of three positions with respect to the bracket.

As illustrated in FIGURE 4, a central connecting web 124 is connected by a suitable screw or bolt 126 to a conveniently accessible part 128 of the vehicle.

The opposing legs 130 of the bracket 122 are designed to embrace and support the cylindrical shell 74 of the unit 70 in either of two positions in which the axis of the shell is perpendicular to the legs 130. For this purpose, opposing portions 132 of the two legs 130 (which are mirror images of each other) are shaped to have individually an inwardly concave form about an axis of curvature generally perpendicular to the respective legs 130.

The two opposed legs 130 are also formed to embrace and support the cylindrical shell 74 of the unit in a position parallel to the legs 130, as illustrated in phantom lines in FIGURE 4. For this purpose, opposing portions 134 of the two legs are shaped to have an inwardly concave form about axes of curvature generally parallel to the respective legs. The bracket 122 is mounted in an accessible location and the cylindrical shell or case 74 of the unit 70 placed in the bracket in a position which provides a most desirable location of the leads 114, 118 with respect to the switch 24b and lead 110.

It will be appreciated that the simple act of mounting the shell 74 of the unit 70, as described, provides a good ground for the time delay switch heating coil 56b, which ground extends through the post 96, cantilever conductor 98, shell 74 and bracket 122 to the metal support structure for the bracket.

Referring now to FIGURES 8 and 9 there is shown another embodiment of control unit of the present invention. The control unit comprises a metallic shell or housing 135, which may serve as a ground for the unit when installed in a vehicle. The shell 135 has its open bottom closed by a plate 136 of electrical insulating material. Circuit means in series between a source of potential and ground is provided and comprises a first circuit defined by a first positive conductor 137 mounted in and extending through plate 136 and at its inner end within the housing supports rectangular blade 139 of a rectangular blade-type cyclic switch 138. A resistance ribbon tension conductor 140 extends from one corner of blade 139 to a diagonally opposite corner of the blade 139 and the conductor 140 intermediate its ends carries a first contact 142. A negative second conductor 143 extends through plate 136 and at its inner end carries a second contact 144 opposite the first contact 142. The contacts 142 and 144 are normally in closed position and in such position the resistance ribbon flexes the bade 139 into an arcuate configuration from its normal flat planar shape to maintain the contacts engaged. Upon passage of current from conductor 137 through contacts 142 and 144 and conductor 143, resistance ribbon 140 being in series in such circuit elongates and the prestressed blade 139 snaps to a position separating contacts 142 and 144 thus opening the circuit between conductors 137 and 143. Upon cooling of the resistance ribbon 140 it contracts stressing the blade to its arcuate configuration and at which contacts 142 and 144 are again engaged or in closed position. Thus the contacts 142 and 144, when potential is applied between conductor 143 and terminal 137 are repeatedly opened and closed to provide intermittent energization of an electrically energizable device connected in series circuit with conductors 137 and 143.

In the foregoing figures it will be noted that the circuit means includes a second circuit in parallel with the first circuit in which a bimetallic cantilever conductor 149 is supported at one end on an electrically positive conductor bracket 150 on insulating plate 136. A resistance heating wire 152 extends from positive conductor 137 around the bimetallic member 149 in a coil leading to a ground connection as at 153 in the insulating plate 136 at one sidewall of the shell 135. The bracket 150 as best seen in FIGURE 8, is electrically connected at 155 with the first conductor 137. A second electrical conductor bracket 156 lies on the upper surface of insulating plate 136 and one end supports a contact 157 in position underlying contact 158 at the free end of the bimetallic conductor member 149. An insulated adjusting screw 160 is threadedly mounted in insulating plate 136 below the end of bracket 156 opposite contact 157 and the screw 160 provides for adjusting the spacing of contacts 157 and 158 in their open position.

In the device as above described during operating of the cyclic switch 139, the resistance coil 152 heats the bimetallic cantilever member 149 and after a predetermined interval of time causes it to flex to close contacts 157 and 158, and which upon closing shunts the circuit of the cyclic switch 139 and effects through conducting brackets 150 and 156 steady electrical energization of a device in circuit with the control unit. The various components of the cyclic switch 139 and the bimetallic switch described may be designed as before described to effect the desired intermittent and steady energization of an electrically energizable device as already above noted. In the particular embodiment described, it will be noted that the adjusting screw means 160 provides for the ready adjustment of the period of intermittent energization through a cyclic switch, such as switch 139, of an electrically energizable device.

In FIGURE 10, to which reference may now be had, I have shown my invention incorporated in an electric control unit having particular utility for use with display signs and for ornamental purposes.

The device in FIGURE 10 comprises an enclosing housing or casing 165 formed of suitable insulating material. A pair of prong members 167 and 166 suitable for mounting in a conventional prong type electrical outlet are mounted in one closed end of the housing and extend inwardly thereof.

It will be noted that the conductor 167 extends lengthwise through the housing 165 and terminates in a first outlet contact portion 169 at an outlet opening 170 at the other end of the housing and that a second conductor member 172 extends from within the housing into outlet opening 173 with its outer end 174 serving as a second outlet contact. The openings 170 and 173 may receive the prongs of male type plug member to electrically connect contacts 169 and 174 with the wires of an extension cord for connecting an electrically energizable device such as an advertising device or a set of Christmas tree lights or other ornamental illuminating devices with a source of potential through the control unit.

The control unit of FIGURE 10 embodies circuit means in series between the potential source and an electrically energizable device in the manner described and such circuit means comprises a first circuit extending from conductor 166 to stationary electrical conductor bracket 175 to which one end of a resistance wire 176 is connected. The other end of resistance wire 176 is connected to a movable electrical conductor bracket 177 connected to one end of a flexible spring member 178 mounted on a channel member 179 of insulating material similar to the structure described in connection with FIGURE 1. The electrical conductor 172 is mounted at the bottom of channel member 179 and has a contact 181 of a cyclic switch 182 mounted thereon for opening and closing engagement with a contact 183 on spring member 178.

As before upon connection of such first circuit with a source of potential and an electrically energizable device expansion and contraction of resistance wire 176 effects intermittent opening and closing of the cyclic switch 182 to effect intermittent energization of an electrically energizable device connected with outlet contacts 169 and 174.

The circuit means of the unit of FIGURE 10 also includes a second circuit for connection in series with a potential source and the electrically energizable device in parallel with the above described first circuit comprising a bimetallic cantilever blade member 185 electrically connected to conductor 166 and having a contact 186 at its free end. A heating coil 188 is connected to the mounted end of the blade 185 and is coiled therearound with its other end connected to outlet conductor 172. A stationary contact 190 is mounted on conductor 172 above contact 186. Current flow through such second circuit causes heating of the bimetal blade by current flow in heating coil 188 and upon flexing of blade 185 contacts 186 and 190 close, shunting the first circuit and effecting steady energization of an electrically energizable device connected to the outlet contacts of the control unit. Upon cooling of the blade 185 due to passage of a larger portion of the current through blade 185, the latter flexes to open contacts 186 and 190 so that the first described circuits effects intermittent energization of the connected device. Such alternate intermittent and steady energization will continue repeatedly so long as the control unit electrically connects the potential source and electrically energizable device. As before the several components may be constructed of selected materials to afford desired alternate periods of intermittent and steady energization of an electrically energizable device.

It will be appreciated that the invention is not necessarily limited to use of the particular construction illustrated, but includes the use of alternatives and equivalents within the spirit and scope of the invention as defined by the claims.

The invention is claimed as follows:

1. For use in an automotive vehicle, having a fluid pressure brake system, brake light circuit means including a brake light, a fluid pressure switch operated by said brake system and coacting with said circuit means to control energization thereof the combination comprising, a cycling switch in said circuit means for effecting intermittent flashing of said brake light in response to closing of said fluid pressure switch, a steady signal switch connected in parallel with said cycling switch and including time delay actuating means energized by said fluid pressure switch to effect a delayed closing of said steady signal switch and shunt said cycling switch to effect a delayed but steady energization of the brake light to produce a steady warning signal, and means for said time delay actuating means for opening said steady signal switch after the same has been closed for a predetermined length of time and effect de-shunting of said cycling switch to again effect through said cycling switch intermittent flashing of said brake light.

2. For use in a vehicle, a warning light control unit comprising, in combination, a cylindrical metal shell open at one end, an insulator base secured to said shell to close said open end thereof, a bowed disk disposed within said shell in generally transverse relation to the axis of the shell, a tension conductor having substantial electrical resistance and being connected to said disk in spanning relation thereto to support the disk and increase the degree of bow in the disk upon contraction of the tension conductor incident to cooling of the tension conductor, a first electrical conductor support connected to said tension conductor to support the latter, said first support being supported on said base and extending outwardly therethrough, a first contact on the convex side of said disk, a second electrical conductor support supported on said base and extending outwardly therethrough, a second contact supported on said second support in opposing relation to said first contact to be engaged by the latter upon cooling of said tension conductor, a first time delay contact supported within said shell by one of said supports, a bimetallic cantilever supported within said shell by the other of said supports, a second time delay contact carried by said cantilever in opposing relation to said first time delay contact to engage the latter upon heating of said cantilever, a grounding contact mounted on said base and being biased into engagement with said shell, a resistance heating element disposed in heat transferring relation to said cantilever and being connected electrically between said grounding contact and one of said supports, a U-shaped metal mounting bracket including two legs having inwardly concave opposing portions shaped to embrace and support said shell with the shell positioned with the axis thereof generally perpendicular to the legs, said legs including inwardly convex opposing portions shaped to embrace and support said shell with the shell positioned with the axis of the shell generally parallel to the legs, two electrical leads connected to portions of said respective conductor supports which extend outwardly through said base, a female electrical connector fixed to the one of said leads which extends from the support to which said heating element is connected, and a male electrical connector fixed to the other of said leads.

3. For use in a vehicle, a warning light control unit comprising, in combination, an insulator base, a metal shell coacting with said base to form an enclosure, a bowed disk disposed within said enclosure, a tension conductor having substantial electrical resistance and being connected to said disk in spinning relation thereto to support the disk and increase the degree of bow in the disk upon contraction of the tension conductor incident to cooling of the tension conductor, a first electrical conductor support connected to said tension conductor to support the latter, said first support being supported on said base and extending outwardly therethrough, a first contact on the convex side of said disk connected electrically through said tension conductor with said first support, a second electrical conductor support supported on said base and extending outwardly therethrough, a second contact supported on said second support in opposing relation to said first contact to be engaged by the latter upon cooling of said tension conductor, two time delay contacts disposed within said enclosure, thermal actuating means in said enclosure coacting with one of said time delay contacts to move the latter into and out of engagement with the other time delay contact, said time delay contacts being connected electrically with said respective supports, resistance heating means disposed in said enclosure in heat transferring relation to said thermal actuating means and being connected electrically between said shell and one of said supports, two electrical leads connected to said respective conductor supports to extend away from said enclosure, a female electrical connector secured to the one of said leads that is connected to the support to which said heating means is connected, and a male electrical connector secured to the other of said leads.

4. For use in a vehicle having brake means applicable for braking the vehicle, signal means comprising an electrically energizable filament and a source of electrical potential for energizing said filament, the combination comprising circuit means between said filament and said potential source, a normally open main control switch in said circuit means having connection with said brake means and being adapted to be closed upon application of said brake means, said circuit means comprising first and second circuits in series relation with said main control swtch and said filament and in parallel relation with each other, cycling means in said first circuit for effecting intermittent energization of said filament upon closing of said main control switch, time delay means in said second circuit for shunting said first circuit a predetermined interval after closing of and with said main control switch in its closed position to render said second circuit of lower electrical resistance than said first circuit to effect the continuous energization of said filament through said second circuit, and said time delay means after a second predetermined interval subsequent to said first predetermined interval and with said main control switch in its said closed position rendering the shunting of said first circuit ineffective and thereby effect intermittent energization of said filament through said first circuit and said cyclic means thereof.

5. A light control unit comprising, in combination, an insulator base, a metal shell coacting with said base to form an enclosure, a bowed member disposed within said enclosure, a tension conductor having substantial electrical resistance and being connected to said member in spanning relation thereto to support said member and increase the degree of bow in said member upon contraction of the tension conductor incident to cooling of the tension conductor, a first electrical conductor support connected to said tension conductor to support the latter, said first support being supported on said base and extending outwardly therethrough, a first contact on the convex side of said member connected electrically through said tension conductor with said first support, a second electrical conductor support supported on said base and extending outwardly therethrough, a second contact supported on said second support in opposing relation to said first contact to be engaged by the latter upon cooling of said tension conductor, two time delay contacts disposed within said enclosure, thermal actuating means in said enclosure coacting with one of said time delay contacts to move the latter into and out of engagement with the other time delay contact, said time delay contacts being connected electrically with said respective supports, resistance heating means disposed in said enclosure in heat transferring relation to said thermal actuating means and being connected electrically between said shell and one of said supports, and two electrical leads connected to said respective conductor supports to extend away from said enclosure.

6. A light control unit comprising, in combination, an insulator base, a shell for said base to form an enclosure, a bowed member disposed within said enclosure, a tension conductor having substantial electrical resistance and being connected to said member in spanning relation thereto to support said member and increase the degree of bow in said member upon contraction of the tension conductor incident to cooling of the tension conductor, a first electrical conductor support connected to said tension conductor to support the latter, said first support being supported on said base and extending outwardly therethrough, a first contact on the convex side of said member connected electrically through said tension conductor with said first support, a second electrical conductor supported on said base and extending outwardly therethrough, a second contact supported on said second support in opposing relation to said first contact to be engaged by the latter upon cooling of said tension conductor, two time delay contacts disposed within said enclosure, thermal actuating means in said enclosure coacting with one of said time delay contacts to move the latter into and out of engagement with the other time delay contact, said time delay contacts being connected electrically with said respective supports, resistance heating means disposed in said enclosure in heat transferring relation to said thermal actuating means, means electrically connecting said resistance heating means including at least one of said supports, and two electrical leads connected to said respective conductor supports to extend away from said enclosure.

7. An electric control unit comprising, in combination, an insulator base, a shell coacting with said base to form an enclosure, cyclic means disposed within said enclosure comprising a blade member, and an electrically conductive tension member of substantial electrical resistance connected to said blade member in spanning relation thereto to vary the configuration of said blade member upon contraction and expansion of said tension member upon heating and cooling of the same, a first contact connected to said cyclic means, a first electric conductor mounted on said base and connected to said first contact of said cyclic means, a second electrical conductor mounted on said base, a second contact supported on said second electrical conductor in opposing relation to said first contact and adapted to be disposed in circuit open and circuit closed relation with respect to said first contact upon heating and cooling of said tension member, two time delay contacts disposed within said enclosure, thermal actuating means in said enclosure coacting with one of said time delay contacts to move the latter into and out of engagement with the other of said time delay contacts, said time delay contacts being connected electrically one each with one of said electrical conductors, resistance heating means disposed in said enclosure in heat transferring relation to said thermal actuating means, and means electrically connecting said resistance heating means including at least one of said electrical conductors.

8. An electric control unit comprising, in combination, an insulator base, a metal shell coacting with said base to form an enclosure, cyclic means disposed within said enclosure comprising a blade member and an electrically conductive tension member of substantial electrical resistance connected to said blade member in spanning relation thereto to vary the configuration of said blade member upon contraction and expansion of said tension member upon heating and cooling of the same, a first contact carried by said tension member, a first electric conductor mounted on said base and connected to said cyclic means, a second electrical conductor mounted on said base, a second contact supported on said second electrical conductor in opposing relation to said first contact and adapted to be disposed in circuit open and circuit closed relation with respect to said first contact upon heating and cooling of said tension member, two time delay contacts disposed within said enclosure, thermal actuating means in said enclosure coacting with one of said time delay contacts to move the latter into and out of engagement with the other of said time delay contacts, said time delay contacts being connected electrically one each with one of said electrical conductors, resistance heating means disposed in said enclosure in heat transferring relation to said thermal actuating means, and means electrically connecting said resistance heating means including at least one of said electrical conductors.

9. An electric control means for use between a source of electrical potential and an electrically energizable device comprising circuit means for connecting the potential source in series with the electrically energizable device, said circuit means comprising a first circuit having cyclic switch means therein for effecting intermittent energization of said electrically energizable means by said source of potential, and a second circuit in parallel with said first circuit including time delay actuating means energized by current flow from said source of potential to said electrically energizable device for shunting said first circuit after a first predetermined interval of intermittent energization of said electrically energizable device and render said second circuit of lower electrical resistance than said first circuit to effect steady energization of said electrically energizable device, and said time delay means after a second predetermined interval subsequent to said first predetermined interval rendering shunting of said first circuit ineffective and thereby effect intermittent energization of said electrically energizable device through said first circuit and said cyclic switch means.

10. An electric control unit comprising, in combination, an insulator base, a metal shell coacting with said base to form an enclosure, cyclic means disposed within said enclosure comprising a blade member and an electrically conductive tension member of substantial electrical resistance connected to said blade member in spanning relation thereto to vary the configuration of said blade member upon contraction and expansion of said tension member upon heating and cooling of the same, a first contact carried by said tension member, a first electric conductor mounted on said base and connected to said cyclic means, a second electrical conductor mounted on said base, a second contact supported on said second electrical conductor in opposing relation to said first contact and adapted to be disposed in circuit open and circuit closed relation with respect to said first contact upon heating and cooling of said tension member, two time delay contacts disposed within said enclosure, thermal actuating means in said enclosure coacting with one of said time delay contacts to move the latter into and out of engagement with the other of said time delay contacts, said time delay contacts being connected electrically one each with one of said electrical conductors, resistance heating means disposed in said enclosure in heat transferring relation to said thermal actuating means, means electrically connecting said resistance heating means including at least one of said electrical conductors, and means for adjusting actuation of said time delay means to provide predetermined periods of intermittent and steady energization of said electrically energizable device.

11. An electric control unit comprising, in combination, an insulator base, a shell coacting with said base to form an enclosure, cyclic means disposed within said enclosure comprising a blade member and an electrically conductive tension member of substantial electrical resistance connected to said blade member in spanning relation thereto to vary the configuration of said blade member upon contraction and expansion of said tension member upon heating and cooling of the same, a first electrical conductor support mounted in said base and connected to said blade member, a first contact on said tension member connected electrically through said blade member with said first support, a second electrical conductor support on said base, a second contact supported on said second support in opposing relation to said first contact and adapted to be disposed in circuit open and circuit closed relation with respect to said first contact upon heating and cooling of said tension member, two time delay contacts disposed within said enclosure, thermal actuating means in said enclosure coacting with one of said time delay contacts to move the latter into and out of engagement with the other of said time delay contacts, said time delay contacts being connected electrically one each with one of said supports, resistance heating means disposed in said enclosure in heat transferring relation to said thermal actuating means, and means electrically connecting said resistance heating means including at least one of said supports.

12. For use in an automotive vehicle, having a fluid pressure brake system, brake light circuit means including a brake light, a fluid pressure switch operated by said brake system and coacting with said circuit means to control energization thereof the combination comprising, a cycling switch in said circuit means for effecting intermittent flashing of said brake light in response to closing of said fluid pressure switch, a steady signal switch connected in parallel with said cycling switch and in series with said brake light and said fluid pressure switch, said steady signal switch having time delay actuating means comprising a resistance heated bimetal conductor energized upon closing of said fluid pressure switch for a predetermined length of time to effect a delayed closing of said steady signal switch and shunt said cycling switch to effect a delayed but steady energization of the brake light to produce a steady warning signal, and said resistance heated bimetal conductor of said time delay actuating means, when energized, maintaining said steady signal switch in shunt relation with said cyclic switch to effect continued steady energization of said brake light until opening of said pressure switch.

13. For use in a vehicle having brake means applicable for braking the vehicle, signal means comprising an electrically energizable filament and a source of electrical potential for energizing said filament, the combination comprising circuit means between said filament and said potential source, a normally open main control switch in said circuit means having connection with said brake means and being adapted to be closed upon application of said brake means, said circuit means comprising first and second circuits in series relation with said main control switch and said filament and in parallel relation with each other, cycling means in said first circuit for effecting intermittent energization of said filament upon closing of said main control switch, time delay means including a resistance heated bimetal conductor in said second circuit for shunting said first circuit when energized for a predetermined interval after closing of and with said main control switch in its closed position to render said second circuit of lower electrical resistance than said first circuit to effect the continuous energization of said filament through said second circuit, and said resistance heated bimetal conductor of said time delay means, when energized, maintaining said second circuit energized and in shunt relation with said first circuit until said main control switch is opened.

14. For use in a vehicle having brake means applicable for braking the vehicle, signal means comprising an electrically energizable filament and a source of electrical potential for energizing said filament, the combination comprising circuit means between said filament and said potential source, a normally open main control switch in said circuit means having connection with said brake means and being adapted to be closed upon application of said brake means, said circuit means comprising first and second circuits in series relation with said main control switch and said filament and in parallel relation with each other, cycling means in said first circuit comprising a pair of normally closed contacts, a spring member carrying one of said pair of contacts, and an electrically conductive tension member for effecting flexing of said spring member to open and close said pair of contacts upon contraction and expansion of said tension member upon heating and cooling of the same to effect intermittent energization of said filament upon closing of said main control switch, time delay means including a resistance heated bimetal conductor in said second circuit for shunting said first circuit when energized for a predetermined interval after closing of and with said main control switch in its closed position to render said second circuit of lower electrical resistance than said first circuit to effect the continuous energization of said filament through said second circuit, and said resistance heated bimetal conductor of said time delay means, when energized, maintaining said second circuit energized and in shunt relation with said first circuit until said main control switch is opened.

References Cited by the Examiner
UNITED STATES PATENTS 1,885,714   11/32   Hampton _____ 340—56

NEIL C. READ, *Primary Examiner.*